US012607287B2

(12) United States Patent
Matt

(10) Patent No.: US 12,607,287 B2
(45) Date of Patent: Apr. 21, 2026

(54) SYSTEM AND METHOD FOR CLEANING AND/OR INSPECTING A PIPELINE

(71) Applicant: Envirobot GmbH & Co. KG, Dietmannsried (DE)

(72) Inventor: Frank Matt, Dietmannsried (DE)

(73) Assignee: ENVIROBOT GMBH & CO. KG, Dietmannsried (DE)

( * ) Notice: Subject to any disclaimer, the term of this patent is extended or adjusted under 35 U.S.C. 154(b) by 312 days.

(21) Appl. No.: 18/322,946

(22) Filed: May 24, 2023

(65) Prior Publication Data

US 2023/0383892 A1     Nov. 30, 2023

(30) Foreign Application Priority Data

May 24, 2022    (DE) .......................... 102022205189.0

(51) Int. Cl.
*F16L 55/48*         (2006.01)
*F16L 3/01*          (2006.01)
(Continued)

(52) U.S. Cl.
CPC .............. *F16L 55/48* (2013.01); *F16L 3/012* (2013.01); *F28G 1/02* (2013.01); *F16L 2101/12* (2013.01); *F16L 2101/30* (2013.01)

(58) Field of Classification Search
CPC ....... F16L 55/48; F16L 3/012; F16L 2101/12; F16L 2101/30; F28G 1/02; B08B 9/0433;
(Continued)

(56) References Cited

U.S. PATENT DOCUMENTS

| | | |
|---|---|---|
| 5,009,242 A | 4/1991 | Prange |
| 5,139,751 A | 8/1992 | Mansfield et al. |

(Continued)

FOREIGN PATENT DOCUMENTS

| | | |
|---|---|---|
| DE | 3310311 A1 | 9/1984 |
| EP | 1486755 A2 | 12/2004 |

(Continued)

OTHER PUBLICATIONS

Machine translation of KR-102299127-B1 (Year: 2021).*

(Continued)

*Primary Examiner* — Erin F Bergner
(74) *Attorney, Agent, or Firm* — Honigman LLP

(57) ABSTRACT

A system for cleaning and/or inspecting a pipeline includes a hose and a working device connected to one end of the hose. The working device includes a sensor device for detecting sensor data representing a movement direction of the working device in the pipeline, a hose drum for winding and unwinding the hose, a motor coupled to the hose drum and configured to rotate the hose drum so as to wind the hose onto the hose drum, and a control device connected to the working device and motor and to determine the movement direction of the working device in the pipeline on the basis of the sensor data and to output to the motor a first control signal which causes the motor to rotate and wind up the hose when the determined movement direction of the working device corresponds to a predetermined first movement direction.

14 Claims, 2 Drawing Sheets

(51) Int. Cl.
| | |
|---|---|
| *F28G 1/02* | (2006.01) |
| *F16L 101/12* | (2006.01) |
| *F16L 101/30* | (2006.01) |

(58) Field of Classification Search
CPC ..... B08B 9/0495; B08B 9/04; B65H 2701/33; B65H 75/4484; G01M 3/005
See application file for complete search history.

(56) References Cited

U.S. PATENT DOCUMENTS

| | | | |
|---|---|---|---|
| 9,683,360 B1 | 6/2017 | Vigoa | |
| 2006/0266134 A1* | 11/2006 | MacMillan | F16L 55/30 73/865.8 |
| 2012/0305031 A1 | 12/2012 | Lewis, Sr. et al. | |
| 2014/0152802 A1 | 6/2014 | Olsson et al. | |
| 2016/0311643 A1 | 10/2016 | Tracey | |

FOREIGN PATENT DOCUMENTS

| | | | | |
|---|---|---|---|---|
| EP | 2258648 A1 | 12/2010 | | |
| GB | 2156643 A | 10/1985 | | |
| KR | 102299127 B1 * | 9/2021 | ............ | G01D 5/264 |
| WO | 2018031471 A2 | 2/2018 | | |
| WO | WO-2021022368 A1 * | 2/2021 | ............ | B08B 3/024 |

OTHER PUBLICATIONS

German Office Action, Application No. DE 10 2022 205 189.0, mailed Mar. 20, 2023.

Examination Report, Application No. DE 10 2022 205 189.0, mailed Mar. 20, 2023.

European Search Report, Application No. 23174921.9, dated Oct. 20, 2023.

\* cited by examiner

SYSTEM AND METHOD FOR CLEANING AND/OR INSPECTING A PIPELINE

CROSS-REFERENCE TO RELATED APPLICATIONS

This application claims priority of German Patent Application No. DE102022205189.0 filed on May 24, 2022, the contents of which are incorporated herein.

TECHNICAL FIELD

The present disclosure relates to a system for cleaning and/or inspecting a pipeline and to a method for carrying out cleaning and/or inspection of a pipeline.

BACKGROUND

For cleaning and inspecting pipes, shafts and sewers, also known more generally as pipelines, which are inaccessible to humans, combined cleaning and inspection systems are generally used. The cleaning systems generally have a hose, in particular an operating medium hose for passing through a cleaning fluid or an operating or working medium, for example water. The operating fluid may for example be passed at high pressure to a nozzle (for example a cleaning nozzle) connected to the hose and ejected through the nozzle (for example cleaning nozzle) into the pipeline, for example so as to eliminate soiling or blockages. The inspection systems usually have an inspection or sensor device, such as a camera.

The hose is generally wound onto a hose drum. To introduce the hose into the pipeline, the hose is unwound from the hose drum, this being done by hand in most cases. The winding of the hose onto the hose drum normally takes place using a motor, for example so as to pull the hose out of the pipeline.

Hose drums driven by a motor are disclosed for example in U.S. Pat. No. 5,139,751 A, 9,683,360 B1 and US 2012/0305031 A1.

WO 2018/031471 A2 describes a system for inspecting and cleaning pipelines in which a cleaning device is arranged at one end of a feed cable, the feed cable being unwound from a drum and being introduced into the pipe by means of a feed mechanism.

EP 2 258 648 A1 and US 2016/311643 A1 describe a reel, driven by an electric motor, for winding up a hose. The winding-up is initiated by pulling the hose by hand and carried out using the motor.

SUMMARY

The object of the present disclosure is to provide improved solutions for cleaning and/or inspection systems for pipelines, in particular solutions in which the handling of the hose is facilitated.

This object is achieved by a system having the features of claim 1 and a method having the features of claim 14.

According to a first aspect of the disclosure, a system for cleaning and/or inspecting a pipeline comprises a hose, a working device connected to one end of the hose for carrying out the cleaning and/or inspection and comprising a sensor device set up to detect sensor data representing a movement direction of the working device in the pipeline, a hose drum onto which the hose can be wound up and from which the hose can be unwound, a motor coupled to the hose drum and formed to rotate the hose drum in a first direction of rotation so as to wind the hose onto the hose drum, and a control device connected in a signal-carrying manner to the working device and motor and set up: to determine the movement direction of the working device in the pipeline on the basis of the sensor data and to output to the motor a first control signal which causes the motor to rotate the hose drum in the first direction of rotation to wind up the hose when the determined movement direction of the working device corresponds to a predetermined first movement direction.

According to a second aspect of the disclosure, a method for inspecting and/or cleaning a pipeline is provided. The method comprises introducing a working device, attached to one end of a hose, into the pipeline, the hose being unwound from a hose drum, cleaning and/or inspecting the pipeline using the working device, detecting a movement direction of the working device using a sensor device of the working device, changing a movement direction of the working device so as to pull the hose, along with the working device, out of the pipeline in a first movement direction, and automatically rotating the hose drum using a motor in such a way that the hose is wound onto the hose drum so as to pull the working device and the hose out of the pipeline when the sensor device detects (or as a reaction to it detecting) the first movement direction as the movement direction.

The method according to the second aspect of the disclosure may be carried out in particular using the system according to the first aspect of the disclosure. The features and advantages disclosed herein in connection with the system are therefore also disclosed for the method and vice versa. In particular, the control device of the system may be formed to cause the system to carry out the method.

An idea underlying the disclosure is that winding-up of the hose onto the hose drum using the motor is initiated on the basis of the movement direction of the working device. The working device, which is attached to one end of the hose and equipped with a sensor device, is connected in a signal-carrying manner to a control device, which outputs a corresponding control signal to the motor when a first movement direction is detected. A movement of the working device in the first movement direction (or rearward direction) may for example be brought about by a user pulling on the hose. The motor may for example be an electric motor.

The system advantageously makes it possible to carry out a method for cleaning and/or inspecting a pipeline in a simple manner. In this context, the end of the hose comprising the working device is introduced into the pipeline, the hose being unwound from the hose drum, so as to carry out the cleaning and/or inspection of the pipeline. The unwinding may optionally take place with or without motor assistance. The sensors in the working head or working device further detect the movement of the working head, and transmit the corresponding data to the control device. The movement of the working head into the pipe corresponds to a movement in a second movement direction (or forward direction). The data processing takes place in the control device. When the working device is pulled out of the pipe again, it being possible for this to be initiated by hand for example, this corresponds to a movement of the working device in the first movement direction, and the control device outputs a control signal to the motor. Accordingly, the hose drum is driven by the motor, and the hose is wound up.

An advantage of the disclosure is that the sensor device makes continuous detection of the movement direction of the working device possible. When the movement direction of the hose or of the working device in the first movement direction is detected, for example when the hose is pulled on, the winding-up of the hose using the motor is initiated automatically, in other words without necessarily having to actuate an actuation device, such as a button, by hand. The handling of the hose is thus facilitated, meaning that the cleaning and/or inspection of pipelines can also take place more rapidly. A further advantage is that the sensors are accommodated in the working device and can thus also be used for other purposes, for example for inspection and/or navigation purposes. It is further advantageous that not only is the winding-up initiated automatically, but it also necessarily takes place when the hose or the working head is moved in the first movement direction, in other words out of the pipe. This avoids hoses that are not wound up being left lying around and reduces the risks that can arise from hoses that are not wound up, for example as a result of tripping. On the other hand, the unwound hose length, which may be detected by an encoder on the hose drum, can be detected more exactly.

Advantageous configurations and developments will be apparent from the further dependent claims and from the description with reference to the drawings.

In some embodiments, it may be provided that the first movement direction corresponds to a movement of the working device in the pipeline towards an opening through which the hose is introduced into the pipeline. The first movement direction thus corresponds to pulling the hose out of the pipeline.

In some embodiments, it may be provided that the motor is formed to rotate the hose drum in a second direction of rotation so as to unwind the hose from the hose drum, the control device being set up to output to the motor a second control signal which causes the motor to rotate the hose drum in the second direction of rotation to unwind the hose when the determined movement direction of the working device corresponds to a predetermined second movement direction. Accordingly, the method may additionally comprise moving the working device in the second movement direction, for example when the working device is introduced into the pipeline, and rotating the hose drum by means of the motor in such a way that the hose is unwound from the hose drum when the sensor device detects the second movement direction as the movement direction.

In some embodiments, it may be provided that the second movement direction corresponds to a movement of the working device in a direction away from an opening through which the hose is introduced into the pipeline. The second movement direction thus corresponds to introducing the hose into the pipe. Thus, not only the winding-up but also the unwinding of the hose can be controlled via the movement of the working device. This may in particular lead to very effective handling of the hose without having to switch the motor by hand.

In some embodiments, it may be provided that the sensor device is set up to detect sensor data representing a movement speed of the working device in the pipeline, the control device being set up to determine a change in the movement speed of the working device in the pipeline on the basis of the sensor data and to output to the motor a third control signal which causes the motor to stop the rotation of the hose drum when the determined movement speed of the working device is less than a predetermined threshold. In some embodiments, the method may accordingly comprise changing the movement speed of the working device in such a way that the working device is braked below a predetermined speed threshold and stopping the rotation of the hose drum using the motor when the sensor device detects the movement speed below a predetermined threshold. This makes it easier to work for example in particular regions which are to be cleaned more intensively and/or inspected more closely without having to switch the motor off by hand.

In some embodiments, it may be provided that the sensor device has at least an acceleration sensor and/or an optical sensor. Acceleration sensors and optical sensors each have the advantage that the sensor data thereof can also be used for further purposes, for example the optical sensors for inspection and the acceleration sensors for navigation or charting, for example using inertial measurement units (IMUs).

In some embodiments, it may be provided that the optical sensor is an imaging sensor, in particular a CMOS sensor, of a camera of the working device, the optical sensor being set up to output image data as sensor data, and the control device being set up to determine the movement direction by way of the image data outputted by the imaging sensor. These image data could for example be displayed on an external screen and thus in particular help to facilitate an inspection or to enable continuous checking of the cleaning. The image data can be processed by the control device using image processing software, so as to determine the movement direction and optionally the movement speed of the working device.

In some embodiments, it may be provided that the sensor device has a light source, the optical sensor being formed to output image data of an abstracted image using light emitted by the light source and reflected by the pipeline, and the control device being set up to determine the movement direction using the image data. Providing abstracted image data, for example low-resolution black-and-white images, advantageously facilitates the image processing. The light source, which may for example be configured as a laser light source or LED, advantageously creates defined lighting conditions, and the sensor can be implemented more cost-effectively.

In some embodiments, it may be provided that the control device is integrated into the working device or the control device is formed separately from the working device. In the latter scenario, the control device may in particular be integrated into the motor.

In some embodiments, it may be provided that the control device is connected by wire, in particular using a data bus, or wirelessly, in particular by radio, for example to the sensor device and/or motor. The radio signal may for example be in a frequency band between 450 and 550 Hz, for example at 512 Hz. If the signals are transmitted by wire, both from the sensor device to the control device and from there to the motor, the signal lines may be integrated into the hose, for example in a hose jacket.

In some embodiments, it may be provided that the control device has a processor and a data store, which is readable by the processor and stores a software which can be run by the processor so as to output the first and optionally the second and/or third control signal.

In some embodiments, it may be provided that the hose is formed for passing through a working fluid such as water, the working device having nozzles for ejecting the working fluid.

In some embodiments, it may be provided that the nozzles of the working device are orientated in such a way that ejecting the working fluid applies a force directed counter to the first movement direction to the working device. As a result, the working device within the pipeline can be moved into the pipe merely using the force generated by ejecting the working fluid, further facilitating the handling of the hose.

In some embodiments, the method according to the second aspect of the disclosure may further comprise automatically rotating the hose drum by means of the motor in such a way that the hose is unwound from the hose drum when the sensor drum detects (or as a reaction to it detecting) the second movement direction as the movement direction. The second movement direction may in particular be counter to the first movement direction.

The above embodiments, configurations and developments can be combined with one another as desired, within reason. Further configurations, developments and implementations of the disclosure also comprise combinations not explicitly mentioned of features of the disclosure which are described above or in the following in relation to the embodiments. In particular, a person skilled in the art will also add individual aspects to each basic form of the disclosure as improvements or supplements. Further, the features and advantages disclosed in connection with the system according to the disclosure are also disclosed for the method and vice versa.

BRIEF DESCRIPTION OF THE DRAWINGS

Further features and advantages of the disclosure are described in the following by way of the drawings, in which.

Figure 1:
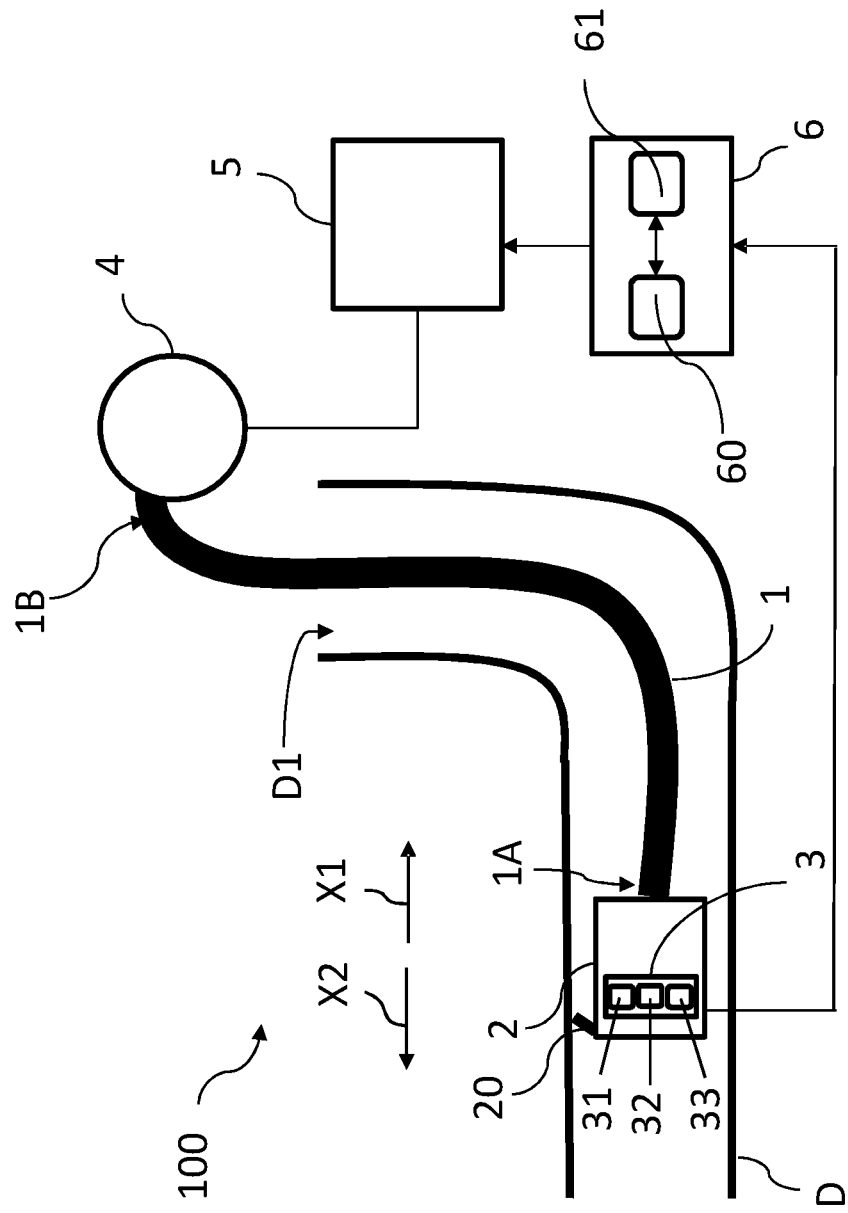
FIG. 1 is a schematic block diagram of a system according to an embodiment of the disclosure.

In the drawings, like reference signs denote like or similar elements. The drawings should not necessarily be treated as being to scale, but may be used to scale in some embodiments. Numberings of method steps are for improved clarity, but do not necessarily imply a particular ordering in cases where nothing to the contrary can be inferred from the text.

DETAILED DESCRIPTION OF PREFERRED EMBODIMENTS

FIG. 1 shows, purely by way of example, a system 100 for cleaning and/or inspecting pipelines, comprising a hose 1, a working device 2, a sensor device 3, a hose drum 4, a motor 5 and a control device 6.

The hose 1 is formed for passing through an operating fluid or working fluid such as water. Optionally, the hose 1 may have electrical lines (not shown) for passing through electrical signals. The hose 1 may for example have an inner tube (not shown) of a flexible plastics material, for example an elastomer material, for passing through the working fluid. Further, the inner tube may be enclosed by an outer tube or jacket formed from an abrasion-resistant, mechanically durable material, for example Kevlar or the like. The optionally provided electrical lines may for example be integrated into the casing or arranged between the casing and the inner hose. Generally speaking, the hose 1 extends between a first end 1A and a second end 1B which is fixed to the hose drum 4. The hose 1 may for example be of a length in a range between 5 m and 100 m.

The working device 2 is merely shown schematically as a block in FIG. 1, and is formed for ejecting working fluid and/or for carrying out inspection functions. As is schematically shown in FIG. 1, the working device 2 may for example have a plurality of nozzles 20 through which the working fluid can be ejected. As is shown in FIG. 1 by way of example, the nozzles 20 may be orientated in such a way that when the working fluid is ejected a force is applied to the working device 2 and slides the working device 2 inwards in the pipeline D. As is schematically shown in FIG. 1, the working device 2 is arranged at the first end 1A of the hose 1 and connected to the hose 1, in particular in such a way that there is a fluidically conductive connection between the hose 1 and the nozzles 20.

The sensor device 3 is shown schematically in FIG. 1, and may be provided with one or more sensors. In FIG. 1, the sensor device 3 comprises by way of example an acceleration sensor 31 and an optical sensor 32. In principle, however, it is also possible for only one sensor to be provided. Generally speaking, the sensor device 3 is set up to detect and output sensor data representing a movement direction X1, X2 and/or movement speed of the working head 2. By way of example, the optical sensor 32 may be an imaging sensor, such as a CMOS sensor, of a camera (not shown) which may be part of the working device 2. Optionally, a light source 33, which emits light, may also be provided on the working device 2. By way of the light reflected from the pipeline D, the optical sensor 32 can generate and output image data of an image. The image data outputted by the optical sensor 32 may for example be visualised on a display (not shown), in particular if the optical sensor 32 is a CMOS sensor or other imaging sensor. As is schematically shown in FIG. 1, the sensor device 3 is attached to the working device 2.

The hose drum 4 is schematically shown in FIG. 1. In general, the hose drum 4 may have a cylindrical support structure. The hose drum 4 may for example be installed on a larger structure such as a sewer cleaning vehicle or a trailer. The hose 1 is connected to the hose drum 4 and can be wound onto the hose drum 4 by rotating said drum in a first direction of rotation and unwound from the hose drum 4 by rotating said drum in a second direction of rotation.

The motor 5 is shown schematically in FIG. 1, and may for example be an electric motor. The motor 5 serves to drive the hose drum 4, and for this purpose is kinematically coupled thereto, for example via a transmission (not shown). The motor 5 may be operated in such a way that it rotates the hose drum 4 in the first direction of rotation so as to wind up the hose 1 onto the hose drum 4. Optionally, the motor 5 may also be operated in such a way that it rotates the hose drum 4 in the second direction of rotation so as to unwind the hose 1 from the hose drum 4.

The control device 6 is merely shown schematically as a block in FIG. 1. As is shown in FIG. 1, the control device 6 may for example have a processor 60 and a data store 61 readable by the processor 60. The processor 60 may have for example a CPU, an FPGA, an ASIC or other data processing structures. The data store 61 may in particular have a non-volatile data storage medium, such as a hard disk, a flash memory, an SD memory or the like. The control device 6 is generally formed to generate output signals, for example in the form of control signals, on the basis of input signals, for example in the form of sensor data.

As is schematically shown in FIG. 1, the control device 6 is connected in a signal-carrying manner to the sensor device 3 and motor 5. The control device 6 receives sensor data from the sensor device 3 and generates, on the basis of the sensor data, corresponding control signals which it outputs to the motor 5 to operate it. For example, the data store 61 may store a software which can be run on the processor 60 so as to generate the control signals on the basis of the sensor data. The signal-carrying connection between the control device 6 and the motor 5 and sensor device 3 may be wired or wireless. Wired signal transmission may take place for example by means of a data bus. Wireless signal transmission may take place in particular by radio, for example in a frequency band between 450 and 550 Hz, for example at 512 Hz. In FIG. 1, the control device 6, the working device 2 and the motor 5 are shown as separate devices. However, it is possible for the control device 6 to be integrated into the motor 5 or working device 2.

Figure 2:
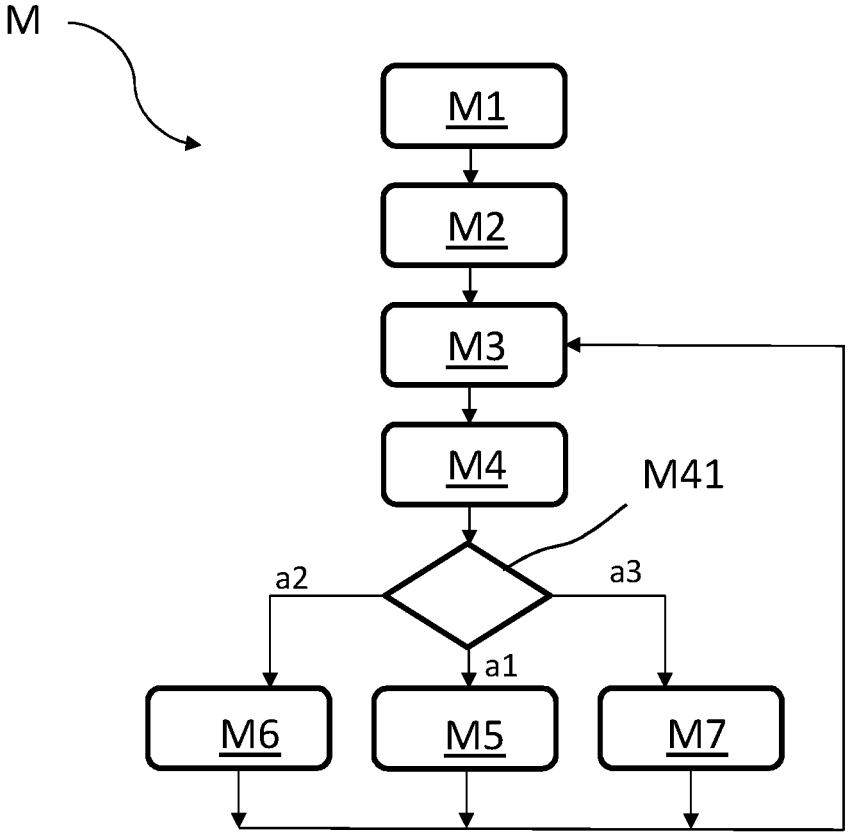
FIG. 2 is a schematic flow chart of a method according to an embodiment of the disclosure.

FIG. 2 show, purely by way of example, the sequence of the method M for inspecting and/or cleaning a pipeline D. The method M may for example be carried out using the aforementioned system 100. For example, the control device 6 may be formed to cause the system 100 to carry out the method M. In particular, in the data store 61, software may be stored which can be run by the processor 60 and which causes the processor 60 to cause the system 100 to carry out the steps of the method M. In the following, the method M is therefore explained purely by way of example with reference to the system 100 shown in FIG. 1.

In a first step, the hose 1 is introduced M1 into a pipeline D through an opening D1 therein. This step may for example be carried out by hand. For this purpose, the hose 1 is pulled off or unwound from the hose drum 4 and moved forwards into the pipeline D along with the working device 2.

Further, the pipeline D is cleaned and/or inspected M2 by means of the working device 2. For example, during the introduction (step M1) of the hose 1 into the pipeline D, the working device 2 may eject a working fluid, for example water, through the various nozzles 20. If the nozzles 20 (for example cleaning nozzles) are orientated as described with reference to FIG. 1, the force generated by ejecting the operating fluid assists or brings about propulsion of the working device 2 in the pipeline D.

In step M3, the movement direction X1, X2 of the working device 2 is detected using a sensor device 3. This detection M3 of the movement direction X1, X2 of the working device 2 can be started at a predetermined time, for example simultaneously with the start of the cleaning and/or inspection (step 2), simultaneously with the introduction (step M1) or at a later time. Thus, in step M3, the sensor device 3 detects sensor data, for example acceleration data or image data, which represent the movement direction X1, X2 and optionally also a movement speed of the working device 2. These sensor data are sent to the control device 6, which determines from them the movement direction X1, X2 and optionally the movement speed of the working device 2. During the introduction (step M1) and typically also during the cleaning (step M2), the working device 2 moves away from the opening D1 further into the pipe D, this corresponding to a movement in the second movement direction X2, as is correspondingly detected by the sensor device 3.

In step M4, the movement direction X1, X2 of the working device 2 is changed. For example, the movement direction X1, X2 can be changed by hand in that the user pulls on the hose 1 or starts to pull it out of the pipeline D. Accordingly, the working device 2 is moved in the direction of the opening D1 of the pipeline D in a first movement direction X1. This movement is detected by the sensor device 3, and the movement direction X1 is determined by the control device 6.

In step M41, the control device 6 carries out a decision step, the result of which depends on the determined movement direction and optionally on the determined movement speed. If it is determined, on the basis of the detected sensor data, that the working device 2 is moving in the first movement direction X1, for example after the change in movement direction in step M4, step M5 is carried out next, as is symbolised by reference sign a1 in FIG. 2. In step M5, the control device 6 outputs a first control signal to the motor

5, causing the motor 5 to drive the hose drum 4 in the first direction of rotation so as to wind up the hose 1. Accordingly, the working device 2 and the hose 1 are pulled out of the pipeline D.

If it is found in step M41 that the detected movement direction of the working device 2 corresponds to the second movement direction X2, step M6 can be carried out next, as is indicated by reference sign a2 in FIG. 2. In step M6, the control device 6 outputs to the motor 5 a second control signal which causes the motor 5 to rotate the hose drum 4 in the second direction of rotation so as to unwind the hose 1. Accordingly, the working device 2 and the hose 1 are moved into the pipeline D.

If it is determined in step M41 that the movement speed of the working device 2 detected by the sensor device 3 is below a predetermined threshold, the method M can jump to step M7, as is symbolised by reference sign a3 in FIG. 2. In step M7, the control device 6 outputs to the motor 5 a third control signal which causes the motor 5 to stop the rotation of the hose drum 4.

It may be provided that the detection M3 of the movement direction X1, X2 of the working device 2 takes place constantly during the cleaning and/or inspection. As a result, for every new change M4 in the movement direction X1, X2 of the working device 2, a new rotation M5, M6, driven by the motor 5, of the hose drum 4 or a stoppage M7 potentially takes place.

The various steps M3, M4, M5, M6 and M7 can therefore be repeated a plurality of times while the cleaning and/or inspection (step M2) are being carried out. In particular, it is also conceivable for cleaning of the pipeline D to take place during the introduction M1 of the hose 1 into the pipeline D and for an inspection of the pipeline D to take place during step M5, in other words during the winding-up of the hose 1 onto the hose drum 4. Step M2 can thus likewise be performed simultaneously with step M5. The inspection (step M2) may for example comprise capturing image data using the sensor device 3 and, optionally, outputting the image data on a display (not shown).

Thus, with rotation of a hose drum 4 assisted by a motor 5, the system 100 implements an improved solution for cleaning and/or inspecting a pipeline D. In particular, handling of the hose 1 is facilitated.

The invention claimed is:

1. A system for cleaning and/or inspecting a pipeline, comprising:
   a hose;
   a working device connected to one end of the hose for carrying out the cleaning and/or inspection and comprising a sensor device set up to detect sensor data representing a movement direction of the working device in the pipeline with respect to an opening through which the hose is introduced into the pipeline;
   a hose drum onto which the hose can be wound up and from which the hose can be unwound;
   a motor coupled to the hose drum and formed to rotate the hose drum in a first direction of rotation so as to wind the hose onto the hose drum; and
   a control device connected in a signal-carrying manner to the working device and motor and set up:
   to determine the movement direction of the working device in the pipeline on the basis of the sensor data and to output to the motor a first control signal which causes the motor to rotate the hose drum in the first direction of rotation to wind up the hose when the determined movement direction of the working device corresponds to a predetermined first movement direction, wherein the first movement direction corresponds to a movement of the working device towards the opening through which the hose is introduced into the pipeline;

wherein the sensor device comprises an optical sensor that is an imaging sensor of a camera of the working device, the imaging sensor being set up to output image data as the sensor data;

and wherein the control device is set up to determine the movement direction by way of the image data outputted by the imaging sensor.

2. The system according to either claim 1, wherein the motor is formed to rotate the hose drum in a second direction of rotation so as to unwind the hose from the hose drum, the control device being set up to output to the motor a second control signal which causes the motor to rotate the hose drum in the second direction of rotation to unwind the hose when the determined movement direction of the working device corresponds to a predetermined second movement direction.

3. The system according to claim 2, wherein the second movement direction corresponds to a movement of the working device in a direction away from the opening through which the hose is introduced into the pipeline.

4. The system according to claim 1, wherein the sensor device is set up to detect sensor data representing a movement speed of the working device in the pipeline, the control device being set up to determine a change in the movement speed of the working device in the pipeline on the basis of the sensor data and to output to the motor a third control signal which causes the motor to stop the rotation of the hose drum when the determined movement speed of the working device is less than a predetermined threshold.

5. The system according to claim 1, wherein the sensor device has at least an acceleration sensor.

6. The system according to claim 1, wherein the imaging sensor is a CMOS sensor.

7. The system according to claim 1, wherein the sensor device has a light source, the optical sensor being formed to output image data of an abstracted image using light emitted by the light source and reflected by the pipeline, and the control device being set up to determine the movement direction using the image data.

8. The system according to claim 1, wherein the control device is integrated into the working device or the control device is formed separately from the working device.

9. The system according to claim 1, wherein the control device is connected by wire or wirelessly to the sensor device and/or the motor.

10. The system according to claim 1, wherein the control device has a processor and a data store, which is readable by the processor and stores a software which can be run by the processor so as to output the first and optionally the second and/or third control signal.

11. The system according to claim 1, wherein the hose is formed for passing through a working fluid, and wherein the working device has nozzles for ejecting the working fluid.

12. The system according to claim 11, wherein the nozzles of the working device are orientated in such a way that ejecting the working fluid applies a force directed counter to the first movement direction to the working device.

13. A method for inspecting and/or cleaning a pipeline using the system according to claim 1, the method comprising the steps of: introducing the working device, attached to the one end of the hose, into the pipeline, the hose being unwound from the hose drum; cleaning and/or inspecting the pipeline using the working device; detecting the movement direction of the working device using the sensor device of the working device; changing the movement direction of the working device so as to pull the hose, along with the working device, out of the pipeline in the first movement direction; and automatically rotating the hose drum using the motor in such a way that the hose is wound onto the hose drum so as to pull the working device and the hose out of the pipeline when the sensor device detects the first movement direction as the movement direction.

14. The system according to claim 9, wherein the control device is connected by wire using a data bus to the sensor device and/or the motor.

* * * * *